US009382341B2

(12) United States Patent
Sagl et al.

(10) Patent No.: US 9,382,341 B2
(45) Date of Patent: Jul. 5, 2016

(54) CARPET COATING COMPOSITION

(71) Applicant: Wacker Chemical Corporation, Adrian, MI (US)

(72) Inventors: Dennis Sagl, Fogelsville, PA (US); John McClurken, Dalton, GA (US); Ronald Joseph Pangrazi, Fleetwood, PA (US)

(73) Assignee: WACKER CHEMICAL CORPORATION, Adrian, MI (US)

( * ) Notice: Subject to any disclaimer, the term of this patent is extended or adjusted under 35 U.S.C. 154(b) by 565 days.

(21) Appl. No.: 13/628,776

(22) Filed: Sep. 27, 2012

(65) Prior Publication Data

US 2014/0087120 A1 Mar. 27, 2014

(51) Int. Cl.
*C08F 2/22* (2006.01)
*D06N 7/00* (2006.01)

(52) U.S. Cl.
CPC ............... *C08F 2/22* (2013.01); *D06N 7/0073* (2013.01); *D06N 2203/042* (2013.01); *D06N 2203/045* (2013.01); *Y10T 428/23986* (2015.04); *Y10T 428/23993* (2015.04)

(58) Field of Classification Search
CPC ... C09J 131/04; D06N 7/0071; D06N 7/0073; D06N 2203/042; D06N 2203/045; C08F 218/08; C08F 210/02; C08F 2/22; C08F 2/24; C08F 2/26; C08F 2/30; C08L 31/04
USPC .......................... 428/96, 97; 156/72; 524/503
See application file for complete search history.

(56) References Cited

U.S. PATENT DOCUMENTS

| | | | | |
|---|---|---|---|---|
| 3,692,723 | A * | 9/1972 | Kasagi et al. ................... | 524/155 |
| 3,769,151 | A * | 10/1973 | Knutson ............... | C08F 261/04 156/332 |
| 3,779,799 | A | 12/1973 | Kennedy et al. | |
| 3,816,362 | A * | 6/1974 | Tsuchihara et al. ........... | 524/459 |
| 4,043,961 | A * | 8/1977 | Beresniewicz ........ | C08F 218/08 428/500 |
| 4,239,563 | A | 12/1980 | Iacoviello | |
| 4,521,561 | A * | 6/1985 | Hausman ............... | C08F 218/08 524/297 |
| 4,713,263 | A * | 12/1987 | Lunsford et al. ............... | 427/206 |
| 4,735,986 | A | 4/1988 | Iacoviello | |
| 4,921,898 | A * | 5/1990 | Lenney ................... | C08F 218/08 524/459 |
| 4,963,422 | A * | 10/1990 | Katz et al. ........................ | 428/90 |
| 5,026,765 | A | 6/1991 | Katz et al. | |
| 5,070,134 | A | 12/1991 | Oyamada et al. | |
| 5,084,503 | A | 1/1992 | Iacoviello | |
| 5,110,856 | A | 5/1992 | Oyamada et al. | |
| 5,124,394 | A | 6/1992 | Lenney | |
| 5,143,966 | A * | 9/1992 | Lee ........................ | C08F 218/08 524/459 |
| 5,629,370 | A * | 5/1997 | Freidzon ............... | C08F 218/08 524/375 |
| 5,633,334 | A | 5/1997 | Walker et al. | |
| 5,849,389 | A * | 12/1998 | Lunsford ........................ | 428/95 |
| 5,936,020 | A | 8/1999 | Freidzon | |
| 6,124,397 | A * | 9/2000 | Smith ............................ | 524/832 |
| 6,162,848 | A | 12/2000 | Lattime et al. | |
| 6,245,851 | B1 * | 6/2001 | Petrocelli .............. | C08F 218/08 524/459 |
| 6,359,076 | B1 | 3/2002 | Lunsford et al. | |
| 6,890,969 | B2 * | 5/2005 | Rabasco et al. ................ | 523/122 |
| 7,485,590 | B2 * | 2/2009 | Rabasco et al. ................ | 442/155 |
| 7,619,017 | B2 * | 11/2009 | Rabasco et al. ................ | 523/122 |
| 9,006,329 | B2 * | 4/2015 | Schulte ................. | C08F 218/04 524/459 |
| 2005/0287336 | A1 * | 12/2005 | Lunsford et al. ................ | 428/97 |
| 2006/0289134 | A1 * | 12/2006 | Yeh .......................... | B31F 1/126 162/111 |
| 2007/0112128 | A1 * | 5/2007 | Weitzel et al. ................. | 524/557 |
| 2007/0184732 | A1 * | 8/2007 | Lunsford et al. ................ | 442/59 |
| 2008/0039572 | A1 | 2/2008 | Mueller et al. | |
| 2011/0028580 | A1 * | 2/2011 | Bergman et al. .............. | 521/149 |
| 2012/0009379 | A1 | 1/2012 | Mueller et al. | |
| 2012/0316282 | A1 * | 12/2012 | Schulte ................. | C08F 218/04 524/503 |
| 2012/0316287 | A1 * | 12/2012 | Weitzel et al. ................. | 524/556 |
| 2013/0102702 | A1 * | 4/2013 | Hain et al. .................... | 523/402 |
| 2013/0131261 | A1 * | 5/2013 | Zecha ........................ | C08F 2/26 524/563 |
| 2013/0149487 | A1 * | 6/2013 | Lunsford et al. ................. | 428/96 |
| 2013/0149929 | A1 * | 6/2013 | Boylan et al. .................... | 442/59 |

(Continued)

FOREIGN PATENT DOCUMENTS

| | | |
|---|---|---|
| CA | 2012389 | 9/1990 |
| EP | 0 385 724 A2 | 9/1990 |
| GB | 1 298 155 | 11/1972 |

(Continued)

OTHER PUBLICATIONS

International Search Report for International Application No. PCT/US2013/060544.

(Continued)

*Primary Examiner* — Cheryl Juska
(74) *Attorney, Agent, or Firm* — RatnerPrestia

(57) ABSTRACT

An aqueous carpet coating composition includes a particulate filler, a polymeric thickener and an aqueous dispersion of a copolymer that includes vinyl acetate units and ethylene units. The dispersion stabilization system includes a) 1.5 to 3 wt % of a combination of polyvinyl alcohols including
  a1) one or more partially hydrolyzed polyvinyl alcohols with a degree of hydrolysis of 85 to 95 mol % and a Hoeppler viscosity of 10-33 mPa·s, and
  a2) one or more highly hydrolyzed polyvinyl alcohols with a degree of hydrolysis of 98 to 100 mol % and a Hoeppler viscosity of 10-33 mPa·s; and
b) 1.5 to 3 wt % of an emulsifier component consisting of one or more nonionic emulsifiers and one or more anionic emulsifiers.

The dispersion has a viscosity of ≤1500 mPa·s and the viscosity of the coating composition is 6000 to 7000 mPa·s.

10 Claims, No Drawings

(56) References Cited

U.S. PATENT DOCUMENTS

2013/0209726 A1* 8/2013 Lunsford et al. ............ 428/95
2014/0162018 A1* 6/2014 Lunsford et al. ............ 428/96

FOREIGN PATENT DOCUMENTS

| WO | WO 90/00967 | 2/1990 |
| WO | WO 99/10396 | 3/1999 |
| WO | WO 2010/089142 A1 | 8/2010 |
| WO | WO 2011/139267 A1 | 11/2011 |
| WO | WO 2011/140065 A2 | 11/2011 |
| WO | WO 2012/020319 A2 | 2/2012 |
| WO | WO 2012/020321 A1 | 2/2012 |

OTHER PUBLICATIONS

Written Opinion of the International Searching Authority for International Application No. PCT/US2013/060544.
T.G. Fox, *Bull. Am. Physics Soc.* 1(3):123 (1956).
Notification of Transmittal of the International Preliminary Report on Patentability dated Jun. 12, 2014.
Associate Summary of September 30, 2015 Office Action of Corresponding Chinese Patent Application CN104684937.

* cited by examiner

CARPET COATING COMPOSITION

FIELD OF THE INVENTION

The present invention relates to a carpet coating composition based on an aqueous vinyl acetate-ethylene copolymer dispersion.

BACKGROUND OF THE INVENTION

Most conventional carpets comprise a primary backing with yarn tufts in the form of cut or uncut loops extending upwardly from the backing to form a pile surface. In the case of tufted carpets, the yarn is inserted into a primary backing by tufting needles and a binder (carpet coating) is applied thereto. In the case of non-tufted or bonded pile carpets, the fibers are embedded and actually held in place by the binder composition.

In both cases, the carpet construction usually also includes a secondary backing bonded to the primary backing. The secondary backing provides extra padding to the carpet, absorbs noise, adds dimensional stability and often functions as a heat insulator. The secondary backing, typically either a woven fabric such as jute or a foam sheet, is laminated to the primary backing by a binder composition (carpet coating) applied to the tuft-lock coated primary backing. Similar techniques are used in the preparation of continuous (rolled) carpets as well as carpet tiles.

Generally these applications require a high degree of water resistance. In addition, there are a number of important requirements which must be met by such a carpet coating. It must be capable of being applied to the carpet and dried using the processes and equipment conventionally employed in the carpet industry for emulsion coating. It must provide excellent adhesion to the pile fibers to secure them firmly to the backing, both in tufted and non-tufted constructions. The coating also must have low smoke density values and high flame retardant properties and must accept a high loading with fillers such as calcium carbonate, clay, aluminum trihydrate, barite, coal fly ash and feldspar. Furthermore, the coating must maintain sufficient softness and flexibility, even with high filler loading or at low temperature, to enable the carpet, if prepared in continuous form, to be easily rolled and unrolled during installation.

WO 90/00967 A1 describes the use of an aqueous polymer latex instead of PVC plastisol for the manufacturing of carpets. Examples of such aqueous latices are vinyl acetate-ethylene copolymers, styrene-butadiene copolymers, and styrene-acrylate copolymers.

U.S. Pat. No. 3,779,799 describes a tuft pile fabric which is coated with aqueous polymer latices based on a vinyl acetate-ethylene copolymer, polyethylene or a carboxylated styrene-butadiene copolymer. In a primary backing woven from synthetic yarns for tufted fabrics and other products, such as carpet and the like, an enhancement in the carpet and/or tufted fabrics tuft raveling resistance capabilities is said to be obtained when the backing is coated with a polymeric substance which effectively reduces such tuft raveling to an acceptable degree. The preferred coating material is a copolymer of ethylene vinyl acetate, and is applied to the backing by any known method including spraying, immersing, brushing or rolling.

U.S. Pat. No. 5,026,765 discloses a carpet coating composition comprising 40 to 80 percent by weight filler and 20 to 60 percent by weight of a latex binder, the binder comprising an emulsion polymer of a) 40 to 80 wt % of a vinyl ester of an alkanoic acid, the acid having from 1 to 13 carbon atoms; b) 5 to 25 wt % of a copolymerizable comonomer having a Tg of at least 50° C.; and; c) 10 to 30% ethylene.

U.S. Pat. No. 4,239,563 discloses use of vinyl acetate-ethylene copolymer emulsions as laminating adhesives for rug backing. The copolymer emulsions are prepared by admixing vinyl acetate-ethylene copolymer, dispersant and thickening agent together, with or without the addition of filler. The vinyl acetate-ethylene copolymer can contain between about 20 and about 70 parts by weight of vinyl acetate and between about 30 and about 80 parts by weight of ethylene. The resulting vinyl acetate-ethylene copolymer emulsions have a glass transition temperature (Tg) of between about −35° C. and about −10° C. The copolymer dispersion is prepared with or without emulsifier. When polyvinyl alcohol is employed as a protective colloid, it is not necessary to add an emulsifier.

WO 2010/089142 discloses vinyl acetate-ethylene-copolymer dispersions suitable in particular for treating textile web materials, and textile web material treated therewith, being suitable in particular as floor coverings or as belts. The vinyl acetate-ethylene-copolymer dispersions are characterized by a low ethylene unit content, relatively high glass transition temperatures, and a small particle size. The vinyl acetate-ethylene copolymer comprises 1 to 4 wt % of ethylene, stabilized with anionic and/or nonionic emulsifier, optionally in the presence of protective colloids. The present inventors have found, however, that the carpet coating composition is too stiff, because of the low content of ethylene in the copolymer, and that the amount of polyvinyl alcohol used in the composition is too low, which negatively impacts dispersion stability and dry and wet tuft bind strength.

US 2005/0287336 A1 is directed to carpet coating compositions employing an emulsion binder prepared by emulsion polymerization of ethylene, a vinyl ester monomer and a functional monomer, and to carpet products prepared with these compositions. The compositions are said to have improved adhesion to polyvinyl butyral backings. The copolymer in the emulsion comprises 60 to 80 wt % of vinyl acetate, 20 to 40 wt % of ethylene, and 1 to 10 wt % of functional comonomers such as those comprising carboxyl groups, amide groups, N-methylol amide groups or hydroxyalkyl groups. The Tg values of the copolymers are at or far below 0° C. The present inventors have found that such binders are too soft, resulting in insufficient tuft bind and delamination strength.

Carpet binders may comprise carpet coating compositions based on crosslinkable copolymers so as to obtain a high degree of water resistance. For example, U.S. Pat. No. 6,359,076 B1 describes a carpet back coating composition based on a vinyl acetate-ethylene copolymer that includes OH-functional monomer units, which copolymer is combined with a crosslinking agent.

GB patent 1298155 describes a process for the production of a foam-backed tufted carpet wherein a latex of vinyl acetate-ethylene copolymer is used in combination with a crosslinking component based on polyvinyl alcohol and glyoxal.

WO 2011/139267 A1 and WO2011/140065 A2 both describe carpet binders based on vinyl acetate-ethylene copolymer latices with crosslinkable monomer units. For crosslinking, silane comonomer units or multifunctional comonomers capable of crosslinking with dihydrazide crosslinkers are introduced into the copolymer. The carpet binders should be substantially free of polyvinyl alcohol for obtaining compatibility with other carpet binders such as styrene-butadiene emulsions.

Crosslinkable carpet binders such as discussed above have the disadvantage of being too dimensionally stable and having a memory effect. Thus, when the carpet is stretched during installation, there is a tendency for the carpet to return to its original dimensions. This results in buckling of the carpet, requiring effort by the installers to remove it. In addition, such crosslinkable binders tend to cause embrittlement, and some crosslinkable comonomers, particularly silane-functional monomers, have the disadvantage of releasing volatile organic compounds (VOC) during crosslinking. A further disadvantage is the high costs of such copolymers with expensive crosslinking comonomers.

In some adhesive applications, emulsions of vinyl acetate-ethylene copolymers may be stabilized with a combination of protective colloids and emulsifiers. For example, EP 385734 A2 discloses an adhesive with high setting speed based on a vinyl acetate-ethylene copolymer emulsion stabilized with a mixture of low-molecular weight, partially saponified polyvinyl alcohol and a polyoxyethylene nonionic surfactant having an HLB value of 16.5 to 17.5.

WO 99/10396 A1 discloses a high solids vinyl acetate-ethylene copolymer emulsion comprising a low-molecular weight polyvinyl alcohol, an ethoxylated aliphatic surfactant, and a dispersant.

U.S. Pat. No. 5,124,394 describes high solids vinyl acetate-ethylene copolymer emulsion, among others, for use in carpet manufacture. Polyvinyl alcohol is removed and substituted by poly(ethyloxazoline) for the improvement of adhesion properties.

U.S. Pat. No. 4,921,898 describes vinyl acetate-ethylene copolymers prepared in the presence of a low viscosity polyvinyl alcohol and a surfactant.

US patent application 2008/0039572 discloses an aqueous vinyl ester-ethylene copolymer dispersion useful as an adhesive for nozzle application processes. The vinyl ester copolymer dispersion is stabilized with a combination of at least one emulsifier and at least one protective colloid, such as a high-viscosity polyvinyl alcohol.

U.S. Pat. No. 4,735,986 and U.S. Pat. No. 5,084,503 describe a vinyl acetate-ethylene copolymer emulsion comprising an aqueous colloidal dispersion of a copolymer containing 65 to 90 wt % vinyl acetate and 10 to 35 wt % ethylene prepared by the emulsion polymerization of the monomers in the presence of a stabilizing system consisting essentially of an 86 to 90 mole % partially hydrolyzed polyvinyl alcohol, a 98 to 99+ mole % fully hydrolyzed polyvinyl alcohol, in a partially hydrolyzed polyvinyl alcohol:fully hydrolyzed polyvinyl alcohol weight ratio from 3:1 to 1:3, and a nonionic polyalkoxylated surfactant. Also disclosed is a carpet backing adhesive composition comprising such a vinyl acetate-ethylene copolymer emulsion, about 0.1 to 3 parts by weight dispersant, about 0.1 to 10 parts by weight thickening agent and between 300 and about 1000 parts by weight filler, all of the components being per 100 parts of the copolymer.

WO/2012/020319 discloses carpet products comprising at least one flexible substrate and at least one coating and/or adhesive layer associated with the at least one flexible substrate. The coating and/or adhesive layer is formed from an aqueous composition comprising: A) an emulsifier-stabilized vinyl acetate/ethylene (VAE) emulsion copolymer dispersion wherein the VAE copolymer therein comprises co-monomers which include at least vinyl acetate copolymerized with ethylene and optionally also with other additional functional and/or non-functional co-monomers; and B) at least one particulate filler material selected from particulate inorganic compounds and particulate plastic material. The vinyl acetate/ethylene copolymer in the copolymer dispersion has a selected ethylene content or glass transition temperature.

WO/2012/020321 discloses carpet products comprising at least one flexible substrate and at least one coating layer associated with the at least one flexible substrate. The coating layer is formed from an aqueous composition comprising: A) an emulsifier-stabilized vinyl acetate/ethylene (VAE) emulsion copolymer dispersion wherein the VAE copolymer therein comprises co-monomers which include at least vinyl acetate copolymerized with ethylene and optionally also with other additional functional and/or non-functional co-monomers; and B) at least one particulate filler material selected from particulate inorganic compounds and particulate plastic material. The vinyl acetate/ethylene copolymer in the copolymer dispersion has a particle size, dw, ranging from about 50 to about 500 nm as determined by Laser Aerosol Spectroscopy. The carpet products are said to maintain their integrity and appearance after multiple machine washing operations.

Despite the above-mentioned efforts, certain properties of VAE-based carpet coating compositions would benefit from further advances. In particular, VAE-based compositions may not provide high levels of wet performance, such as wet tuft bind strength and wet delamination strength. Further, conventional VAE-based carpet compositions may require the inclusion of significant amounts of thickeners, which tend to be relatively expensive. For these and other reasons, improved VAE-based carpet coating compositions would be of significant commercial interest.

SUMMARY OF THE INVENTION

In one aspect, the invention provides an aqueous carpet coating composition including a particulate filler, a polymeric thickener and an aqueous dispersion of a copolymer. The copolymer includes from 80 to 95 wt % vinyl acetate units and from 5 to 20 wt % ethylene units, in each case based on the total amount of monomer units in the copolymer. The dispersion is prepared by emulsion polymerization of the monomers constituting the copolymer in the presence of a stabilization system including
  a) 1.5 to 3 wt %, based on the on the total amount of monomers, of a combination of polyvinyl alcohols including
    a1) one or more partially hydrolyzed polyvinyl alcohols with a degree of hydrolysis of 85 to 95 mol % and a Hoeppler viscosity of 10-33 mPa·s, and
    a2) one or more highly hydrolyzed polyvinyl alcohols with a degree of hydrolysis of 98 to 100 mol % and a Hoeppler viscosity of 10-33 mPa·s; and
  b) 1.5 to 3 wt %, based on the total weight of monomers, of an emulsifier component consisting of one or more nonionic emulsifiers and one or more anionic emulsifiers, wherein the one or more anionic emulsifiers constitute from 3 to 12 wt % of the emulsifier component.

The copolymer has an onset glass transition temperature in a range from 0° C. to 22° C. and the aqueous dispersion of the copolymer has a Brookfield LV viscosity of ≤1500 mPa·s. The amount of polymeric thickener is no more than 6 wt % relative to the amount of aqueous dispersion of the copolymer, and the Brookfield RV viscosity of the aqueous carpet coating composition is in a range from 6000 to 7000 mPa·s.

DETAILED DESCRIPTION OF THE INVENTION

Surprisingly, it has been found that carpet manufactured with coating compositions comprising a vinyl acetate-ethylene-copolymer (VAE) copolymer dispersion, wherein the dispersion is stabilized with a specific stabilization system, shows improved wet tuft binding and wet delamination strength compared with those employing prior art VAE dispersions such as those taught for example in U.S. Pat. No. 4,735,986 and U.S. Pat. No. 5,084,503. The stabilization system includes a combination of at least two specific types of polyvinyl alcohol and two specific types of emulsifier. It has further been found that the use of this stabilization system also makes it possible to use relatively little thickener in order to provide suitable viscosity for the coating compositions. The components of the coating composition will now be described, followed by a description of methods of making and using the composition.

Copolymer Components

The copolymer dispersion includes a copolymer comprising vinyl acetate units in an amount of 70 to 95 wt %, based on the total weight of monomers charged when preparing the copolymer. Preferably the vinyl acetate content is in the range of 75 to 95 wt %, more preferably the vinyl acetate content is in the range of 80 to 95 wt %, and typically in the range of 85 to 92 wt %.

The copolymer comprises ethylene in an amount of 5 to 20 wt %, based on the total weight of monomers charged when preparing the copolymer. The amount is typically 8 to 15 wt %, most typically 10 to 12 wt %.

Most preferred copolymers are those of ethylene and vinyl acetate without further monomers. Nonetheless, in some embodiments the copolymer may include 0.1 to 30 wt %, preferably 0.1 to 10 wt %, in each case based on the total weight of monomers, of other non-functional monomer units selected from the group consisting of vinyl chloride, (meth) acrylic acid esters and vinyl esters other than vinyl acetate. Suitable other vinyl esters are those of carboxylic acids with 3 to 12 carbon atoms such as vinyl propionate, vinyl butyrate, vinyl 2-ethyl-hexanoate, vinyl laurate, 1-methyl vinyl acetate, vinyl pivalate and vinyl esters of α-branched monocarboxylic acids with 9 to 11 carbon atoms, such as VeoVa™9R, VeoVa™10R, or VeoVa™11R (available from Hexion Specialty Chemicals, Inc., Columbus, Ohio). Suitable methacrylic or acrylic acid esters are esters of straight-chain or branched alcohols having 1 to 15 C atoms, for example methyl acrylate, methyl methacrylate, ethyl acrylate, ethyl methacrylate, propyl acrylate, propyl methacrylate, butyl acrylate (n-, iso- and tert-), n-butyl methacrylate, 2-ethyl-hexyl acrylate and norbornyl acrylate. Methyl acrylate, methyl methacrylate, butyl acrylate and 2-ethylhexyl acrylate are preferred. Such non-functional monomers may be introduced for example to adjust glass transition temperature or hydrophobicity.

In some embodiments, auxiliary monomers may be copolymerized in an amount up to 10 wt %, preferably 0.05 to 10 wt %, in each case based on the total weight of monomers. Examples of auxiliary monomers are ethylenically unsaturated monocarboxylic and dicarboxylic acids, typically acrylic acid, methacrylic acid, fumaric acid and maleic acid; ethylenically unsaturated carboxamides and carbonitriles, typically acrylamide and acrylonitrile; monoesters and diesters of fumaric acid and maleic acid, such as the diethyl and diisopropyl esters, and also maleic anhydride; and ethylenically unsaturated sulphonic acids and their salts, typically vinylsulphonic acid and 2-acrylamido-2-methyl-propanesulphonic acid. Such auxiliary monomers may for example improve dispersion stability. However, in some embodiments it is not necessary or desirable to include auxiliary monomers, and any or all of the above may be excluded. In particular, the copolymer may exclude anionic monomers, for example monomeric sulphonates, carboxylates, phosphonates and/or phosphates, including both acid and salt forms of these.

Crosslink-forming monomers, for example polyethylenically unsaturated monomers, epoxy-functional monomers, silicon-functional monomers, or N-methylolacrylamide, are preferably excluded from the copolymers used in practicing the invention. Similarly, the use of external crosslinkers, i.e., crosslinkers (such as dihydrazide compounds) that are not part of the monomers used for making the copolymers, is avoided in preparing carpet coating compositions in some embodiments of the invention.

The monomers are preferably selected so as to give copolymers with an onset glass transition temperature, Tg, of 0° C. to 22° C., preferably 15° C. to 20° C., and more preferably 17° C. to 18° C. The glass transition temperature Tg of the copolymers may be determined in a known manner by means of differential scanning calorimetry (DSC). The Tg may also be calculated approximately in advance by means of the Fox equation. According to Fox T. G., Bull. Am. Physics Soc. 1, 3, page 123 (1956), it holds that: $1/Tg = x_1/Tg_1 + x_2/Tg_2 + \ldots + x_n/Tg_n$, where $x_n$ is the mass fraction (wt %/100) of the monomer n and $Tg_n$ is the glass transition temperature, in kelvins, of the homopolymer of the monomer n. Tg values for homopolymers are listed in the Polymer Handbook, 2nd Edition, J. Wiley & Sons, New York (1975).

Polyvinyl Alcohol(s)

As used herein, references to polyvinyl alcohol having a particular mol % degree of hydrolysis will be understood to refer to polyvinyl alcohol resulting from hydrolysis of polyvinyl acetate such that the recited mol % of acetate groups has been removed by hydrolysis.

The stabilizing system comprises at least two types of polyvinyl alcohol. The first type includes one or more partially hydrolyzed polyvinyl alcohols with a degree of hydrolysis of 85 to 95 mol % and a relatively high Hoeppler viscosity of ≥10 mPa·s. As used herein, the term "Hoeppler viscosity" denotes viscosity of a 4 wt % aqueous solution measured according to DIN 53015, Happier method at 20° C. Preferably the degree of hydrolysis is 85 to 90 mol %. Preferably the Hoeppler viscosity is 11 to 40 mPa·s, most preferably 13 to 30 mPa·s.

The second type of polyvinyl alcohol includes at least one highly hydrolyzed polyvinyl alcohol with a relatively high Hoeppler viscosity of ≥10 mPa·s. The degree of hydrolysis of the high-viscosity, highly hydrolyzed polyvinyl alcohol is 98 to 100 mol %, typically 98 to 99.95 mol %, and most typically 98 to 99 mol %. Preferably the Hoeppler viscosity of the high-viscosity, highly hydrolyzed polyvinyl alcohol is 11 to 40 mPa·s, most preferably 13 to 30 mPa·s.

Both types of polyvinyl alcohol also include hydrophobically modified polyvinyl alcohols, e.g., polyvinyl alcohols with hydrophobic comonomers, such as ethylene.

The total amount of the polyvinyl alcohols a1) and optionally a2) is typically at least 1 wt %, or at least 1.5 wt %, or at least 2 wt %. The amount is typically at most 5 wt %, or at most 4 wt %, or at most 3 wt %, or at most 2.5 wt %. These percentage figures are based on the total weight of monomers. If the polyvinyl alcohols a1) are used in combination with polyvinyl alcohols a2) the weight ratio of a1) to a2) is in a range from 10:1 to 1:10, more typically in a range from 4:1 to 1:4, and most typically from 3:1 to 1:3.

Emulsifier(s)

The copolymer stabilizing system also contains an emulsifier component that includes at least one nonionic emulsifier or a mixture thereof with at least one anionic emulsifier. The total amount of emulsifier component is at least 1.5 wt %, based on the total weight of monomers. In some embodiments, cationic surfactants are excluded from the copolymer dispersion or the carpet coating made from it.

Suitable nonionic emulsifiers are, for example, acyl, alkyl, and oleyl ethoxylates. These products are available commercially, for example, under the name GENAPOL® or LUTENSOL®. Suitable nonionic emulsifiers also include ethoxylated branched or unbranched fatty alcohols (aliphatic alcohols), preferably having a degree of ethoxylation of 3 to 80 ethylene oxide units and $C_6$ to $C_{36}$ alkyl radicals. Suitable nonionic emulsifiers are also $C_{13}$-$C_{15}$ oxo-process alcohol ethoxylates having a degree of ethoxylation of 3 to 35 ethylene oxide units, $C_{16}$-$C_{18}$ fatty alcohol ethoxylates having a degree of ethoxylation of 11 to 80 ethylene oxide units, $C_{10}$ oxo-process alcohol ethoxylates having a degree of ethoxylation of 3 to 11 ethylene oxide units, $C_{13}$ oxo-process alcohol ethoxylates having a degree of ethoxylation of 3 to 35 ethylene oxide units, polyoxyethylenesorbitan monooleate having 20 ethylene oxide groups, copolymers of ethylene oxide and propylene oxide with a minimum content of at least 10 wt % of ethylene oxide, polyethylene oxide ethers of oleyl alcohol, having a degree of ethoxylation of 4 to 20 ethylene oxide units.

Preferred are ethoxylated branched or unbranched aliphatic alcohols, particularly having a degree of ethoxylation of 3 to 80 ethylene oxide units and $C_8$ to $C_{36}$ alkyl radicals. Preferred nonionic emulsifiers are also $C_{13}$-$C_{15}$ oxo-process alcohol ethoxylates having a degree of ethoxylation of 3 to 35 ethylene oxide units, and $C_{16}$-$C_{18}$ aliphatic alcohol ethoxylates having a degree of ethoxylation of 11 to 80 ethylene oxide units. Particularly preferred are $C_{12}$-$C_{14}$ aliphatic alcohol ethoxylates having a degree of ethoxylation of 3 to 35 ethylene oxide units. In some embodiments, the copolymer dispersion and/or the carpet coating composition made from it is free of alkylphenol ethoxylates and esters thereof.

In some embodiments the emulsifier component comprises a mixture of at least one nonionic and at least one anionic emulsifier. Examples of suitable anionic emulsifiers are sodium, potassium, and ammonium salts of straight-chain aliphatic carboxylic acids having 12 to 20 C atoms; sodium hydroxyoctadecanesulfonate; sodium, potassium, and ammonium salts of hydroxyl-fatty acids having 12 to 20 C atoms and the sulfonation and/or acetylation products thereof; sodium, potassium, and ammonium salts of alkyl sulfates, also as triethanolamine salts, and sodium, potassium, and ammonium salts of alkylsulfonates having in each case 10 to 20 C atoms and of alkylarylsulfonates having 12 to 20 C atoms; dimethyldialkylammonium chlorides having 8 to 18 C atoms and its sulfonation products; sodium, potassium, and ammonium salts of sulfosuccinic esters with aliphatic saturated monohydric alcohols having 4 to 16 C atoms, and sulfosuccinic 4-esters with polyethylene glycol ethers of monohydric aliphatic alcohols having 10 to 12 C atoms, more particularly their disodium salts, and of biscyclohexyl sulfosuccinate, more particularly its sodium salt; ligninsulfonic acid and also its calcium, magnesium, sodium, and ammonium salts; resin acids and also hydrogenated and dehydrogenated resin acids, and also their alkali metal salts.

The most preferred anionic emulsifiers are the sodium, potassium, and ammonium salts of alkyl sulfates and of alkylsulfonates having in each case 10 to 20 C atoms, and also of alkylarylsulfonates having 12 to 20 C atoms, and of sulfosuccinic esters with aliphatic saturated monohydric alcohols having 4 to 16 C atoms.

The total amount of emulsifier component is at least 1.5% wt %, preferably 1.6 to 3 wt %, based in each case on the total weight of the monomers. Typically, the amount of emulsifier will be at least 1.7, or at least 1.8, or at least 1.9, or at least 2.0 wt %. If an anionic emulsifier is part of the emulsifier component, it will typically constitute at least 1 wt %, or at least 2 wt %, or at least 3 wt % of the total. It will typically constitute at most 18 wt %, or at most 15 wt %, or at most 12 wt % of the total.

The Brookfield LV viscosity of the aqueous copolymer dispersion is ≤1500 mPa·s, typically ≤1000 mPa·s and most typically ≤800 mPa·s. As used herein, Brookfield LV viscosity is measured using a Brookfield LV viscometer at 25° C., using spindle 3 at 60 revolutions per minute (rpm). When Brookfield RV viscosity is specified, it denotes measurement on a Brookfield RV viscometer at 25° C. with a #5 spindle at 20 rpm.

The aqueous copolymer dispersion has a formaldehyde level of less than 10 wt. ppm based on the total weight of the dispersion, and preferably less than 5 wt. ppm. Formaldehyde levels are determined by high pressure liquid chromatography (HPLC) using method ASTM D5910-05.

Preparation of the Copolymer Dispersion

The aqueous copolymer dispersion can be prepared by emulsion polymerization using conventional emulsion polymerization procedure. Typically at a temperature in a range from 40° C. to 150° C., more typically 50° C. to 120° C. and most typically 60° C. to 100° C. The polymerization pressure is generally between 40 and 100 bar, more typically between 45 and 90 bar, and may vary particularly between 45 and 85 bar, depending on the ethylene feed.

Polymerization may be initiated using a redox initiator combination such as is customary for emulsion polymerization. Examples of suitable oxidation initiators are hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile, and the sodium, potassium, and ammonium salts of peroxodisulfuric acid. Preference is given to the sodium, potassium, and ammonium salts of peroxodisulfuric acid and to hydrogen peroxide. The stated initiators are used in general in an amount of 0.01% to 2.0 wt %, based on the total weight of the monomers.

The stated oxidizing agents, more particularly the salts of peroxodisulfuric acid, may also be used on their own as thermal initiators.

Suitable reducing agents include ammonium or alkali metal sulfites and bisulfites, as for example sodium sulfite, the derivatives of sulfoxylic acid such as zinc sulfoxylates or alkali metal formaldehyde sulfoxylates, such as sodium hydroxymethanesulfinate (Brüggolit). It is preferred to use a non-formaldehyde generating redox initiation system. In general, suitable non-formaldehyde generating reducing agents for redox pairs include, as non-limiting examples, those based on ascorbic acid or its salts, or erythorbate (iso-ascorbic acid) or its salts, or tartaric acid or its salts, or bisulfite salts particularly sodium bisulfite, as known in the art, or disodium glycolic acid sulfonate hydrate, which is available as a commercial reducing agent known as BRUGGOLITE® FF6M manufactured by Brueggeman Chemical of Heilbronn, Germany. It is preferred to use disodium glycolic acid sulfonate hydrate, or sodium sulfite, or ascorbic acid or its salts, or erythorbic acid (iso-ascorbic acid) or its salts. The amount of reducing agent is preferably 0.015% to 3 wt %, based on the total weight of the monomers.

Regulating substances may be used during the polymerization to control the molecular weight of the copolymer. If regulators are used, they are employed typically in amounts between 0.01% to 5.0 wt %, based on the total weight of the monomers to be polymerized, and are metered separately or else as a premix with reaction components. Examples of such substances are n-dodecyl mercaptan, tert-dodecyl mercaptan, mercaptopropionic acid, methyl mercaptopropionate, isopropanol, and acetaldehyde. It is preferred not to use any regulating substances.

All of the polyvinyl alcohol or all of the emulsifier may form an initial charge, or all of the polyvinyl alcohol or all of the emulsifier may form a feed, or portions of the polyvinyl alcohol or of the emulsifier may form an initial charge and the remainder may form a feed after the polymerization has been initiated. The feeds may be separate (spatially and chronologically), or all or some of the components may be fed after pre-emulsification. In a preferred embodiment all of the polyvinyl alcohol and optionally all of the emulsifier are charged initially to the reactor.

All of the monomers may form an initial charge, or all of the monomers may form a feed, or portions of the monomers may form an initial charge and the remainder may form a feed after the polymerization has been initiated. The feeds may be separate (spatially and chronologically), or all or some of the components may be fed after pre-emulsification. In a preferred embodiment at least a part of the monomers is added in the initial charge, preferably 75 to 85 wt % of the monomers are added in the initial charge.

Once the polymerization process has ended, post-polymerization may be carried out using known methods to remove residual monomer, one example of a suitable method being post-polymerization initiated by a redox catalyst. Volatile residual monomers may also be removed by distillation, preferably at subatmospheric pressure, and, where appropriate, by passing inert entraining gases, such as air, nitrogen, or water vapor, through or over the material.

The solids content of suitable aqueous copolymer dispersions according to the invention is typically in a range from 45% to 75 wt %.

Carpet Coating Composition

Carpet coating compositions according to the invention include an aqueous copolymer dispersion as described above, combined with one or more fillers and one or more thickeners.

Any filler suitable for use in carpet manufacture may be used. Examples include mineral fillers or pigments, including those known in the art, such as calcium carbonate, ground glass, clay, kaolin, talc, barites, feldspar, titanium dioxide, calcium aluminum pigments, satin white, synthetic polymer pigment, zinc oxide, barium sulphate, gypsum, silica, alumina trihydrate, mica, coal fly ash, hollow polymer pigments, and diatomaceous earth. Mixtures of fillers can also be employed.

The amount of filler in the composition can vary depending upon the density of the filler and the coating properties desired. Typically it will be from about 50 to about 800 dry weight parts per 100 dry weight parts of copolymer solids, and preferably from about 100 to about 600 dry weight parts per 100 dry weight parts of copolymer solids.

One or more polymeric thickeners should be included in the composition to provide sufficient viscosity for application according to conventional methods. Any polymeric thickener known in the carpet coating art may be used, for example hydroxyethyl cellulose and sodium polyacrylate. Although any amount of polymeric thickener may be used, the inventors have found that typically no more than 6 wt % of thickener is needed, relative to the amount of aqueous dispersion of the copolymer, and thus in some embodiments of the invention no more than 6 wt % is used. In some embodiments, at most 5 wt % or at most 4 wt % is used. Typically, at least 1 wt % of thickener, or at least 2 wt %, is used.

The Brookfield RV viscosity of the resulting coating composition should be in a range from 6000 to 7000 mPa·s.

The carpet coating composition may optionally include other conventional additives known in the art, for example colorants, biocides, anti-foaming agents and filler/pigment dispersants, e.g., sodium polyacrylates.

Carpet Production

Carpet coating compositions according to the invention may be used to produce conventional tufted carpet, non-tufted carpet, and needle-punched carpet, and can be applied using equipment known to those skilled in the art, such as that used in carpet mills. Thus, the carpet coating composition may be useful in the production of pile carpets having a primary backing with pile yarns extending from the primary backing to form pile tufts; as well as non-tufted carpets wherein the fibers are embedded into the aqueous composition that has been coated onto a woven or non-woven substrate.

For example, in preparing a tufted carpet, the yarn is tufted or needled into a primary backing, which is generally non-woven polypropylene, polyethylene or polyester or woven jute or polypropylene. If a secondary backing is used, it is generally formed of woven or nonwoven materials similar to those used as the primary backing. Such a secondary backing can provide dimensional stability to the carpet.

In forming a non-tufted carpet, the carpet coating composition is generally applied to a scrim surface. The fibers then are directly embedded into the wet coating using conventional techniques and then dried. A secondary coating similar to that described above is desirably employed.

The present invention provides a carpet coating that yields significant improvements in dry and wet tuft binding strength as well as dry and wet delamination strength compared to vinyl acetate-ethylene (VAE) copolymer dispersions available commercially or described in prior art.

The examples below illustrate the invention without limiting it.

EXAMPLES

Method of Preparation of Aqueous Vinyl Acetate-Ethylene Dispersions

Example 1

A vinyl acetate-ethylene (VAE) copolymer dispersion useful for making carpet coating compositions according to the invention was prepared as follows. The following ingredients were mixed together: 600.0 g of deionized water, 192.5 g of a 10% aqueous solution of CELVOL® 513 in deionized water (CELVOL® 513 from Celanese Chemicals is a polyvinyl alcohol having an average hydrolysis level of 86 to 89 mol % and a Hoeppler viscosity of 13 to 15 mPa·s), 192.5 g of a 10% aqueous solution of CELVOL® 325 (CELVOL® 325 from Celanese Chemicals is a polyvinyl alcohol having an average hydrolysis level of 98.0 to 98.8 mol % and a Hoeppler viscosity of 28 to 32 mPa·s), and 72.2 g of ABEX® 2525/40 (ethoxylated tridecyl alcohol with an average of 33 moles of ethoxylation per alcohol, available from Rhodia, New Brunswick, N.J.). The pH of this mixture was adjusted to 3.9 using 1.2 g of a phosphoric acid solution (50%, in water), and 3.6 g of a ferrous ammonium sulfate solution (5% in water) was then added to the mixture. This mixture was added to a one gallon pressure reactor that had been purged with nitrogen, and 1370.0 g of vinyl acetate was added with agitation (200 rpm).

The reactor was purged with ethylene, the agitation was increased to 1000 rpm, and 212 g of ethylene was added to the reactor. The temperature was then increased to 35° C., and 5.6 g of a 9.5% aqueous sodium erthyorbate solution (pH adjusted to 4.5 with a 50% aqueous solution of phosphoric acid) was added to the reactor. Both a solution of 3.0% aqueous hydrogen peroxide and the 9.5% aqueous sodium erythorbate were then continuously fed to the reactor at a rate of 0.2 g/min. After the reactor temperature rose 1° C., the reactor temperature was allowed to increase to 85° C. over 60 minutes, and an additional 343.0 g of vinyl acetate monomer was fed to the reactor over 90 minutes at a rate of 3.8 g/min.

The hydrogen peroxide and sodium erythorbate feeds were maintained at equal flow rates and adjusted so that the 85° C. reaction temperature was maintained. The unreacted vinyl acetate was measured during the course of the reaction and found to be 26.7% after 1 h, 12.1% after 1.5 h, and 1.3% after 2.25 h. At the end of 2.25 h, the hydrogen peroxide and sodium erythorbate feeds were stopped, the reaction was cooled to 50° C. and the reaction mixture was transferred to a degasser to remove unreacted ethylene. A mixture of 1.0 g of FOAMASTER VF (a defoamer from Rhodia) and 5 g of deionized water were added to inhibit foam formation. In order to reduce unreacted vinyl acetate monomer below 0.1%, 18.9 g of the 9.5% aqueous sodium erythorbate solution and 50.0 g of 3.0% aqueous tert-butyl hydroperoxide solution were added over 20 minutes. After that, 7.0 g of a 7.0% aqueous hydrogen peroxide solution was added over 15 minutes. Finally, the pH of the dispersion was adjusted to 6.7 with 25% aqueous sodium hydroxide.

The final properties of the dispersion were as follows:

| | |
|---|---|
| Solids | 58.1% |
| Brookfield LV viscosity | 202 mPa · sec |
| pH | 6.7 |
| Grits | 502 ppm |
| Tg (onset) | 15° C. |

Example 2

Another dispersion was produced in the manner described in Example 1, except that 144.4 g of ABEX® 2525/40 was used instead of 72.2 g of ABEX® 2525/40.

The final properties of this dispersion were as follows:

| | |
|---|---|
| Solids | 58.2% |
| Brookfield LV viscosity | 818 mPa · sec |
| pH | 6.4 |
| Grits (100 mesh) | 41 ppm |
| Tg (onset) | 10° C. |

Comparative Example 3

VINNAPAS® CA54 emulsion was used. This is a commercial emulsion commonly used for making carpet binders, available from Wacker Chemicals Corp. and produced according to U.S. Pat. No. 5,084,503. This emulsion uses a 3.1% loading of a polyvinyl alcohol having a degree of hydrolysis from 85 to 90% and a Hoeppler viscosity of 4 mPa·s, as a stabilizing colloid when preparing the emulsion.

Carpet coating compositions were prepared from the copolymer dispersions of Examples 1 and 2 and Comparative Example 3. This was done by combining 100 dry parts of the aqueous VAE dispersion, 0.33 dry parts of ammonium laurel sulfate, 450 dry parts of D-200 Whiting (commercially available calcium carbonate from Imerys) and diluting with water to a total solids of 81.5%. PARAGUM® 277 (sodium polyacrylate thickener from Royal Adhesives-Parachem) was then added to the formulation in sufficient quantity to produce a Brookfield RV viscosity in the range of 6,000 to 7,000 mPa·s.

Tandus Flooring carpet style #5107 greige-goods was coated with 28 dry ounces per square yard (950 g/m$^2$) of carpet coating composition, frothed (i.e., foamed) by sparging air through the formulation. The density of the frothed formulation was in the range of 820 to 875 grams per quart (867 to 925 g/L). Two pieces were coated.

A 30 mil (760 µm) draw down of non-frothed formulation was made on a glass plate using a secondary application bar. A woven polypropylene action back was placed on top of the wet formulation and a large stainless steel roller (1250 g, 3 cm diameter and 40.5 cm long) was rolled over the dry side of the action back. The action back was removed from the glass plate and placed on top of the wet precoated carpet, fuzzy side with adhesive next to carpet. The stainless steel roller was rolled down and back across the action back two times (no pressure, weight of roll only). Two pieces were coated.

The coated samples were placed in an oven at 270±2° F. (132±1° C.) for 20 minutes and then cooled to room temperature before testing. At room temperature, an Instron mechanical tester was used to determine the dry tuft bind strength and the dry delamination strength of the carpet. In addition, a piece of coated carpet was soaked exactly 10 minutes in tap water. Excess water was removed using paper towels, and the wet tuft bind strength and wet delamination strength of the carpet were determined using an Instron mechanical tester. The dry tuft bind strength and delamination strength and the wet tuft bind strength and delamination strength for the carpets coated with the aqueous VAE copolymer dispersions are recorded in Table 1.

TABLE 1

| | TBS [lbf/in (N/m)] | | DS [lbf/in (N/m)] | |
|---|---|---|---|---|
| | Dry | Wet | Dry | Wet |
| Example 1 | 9.5 (1664) | 5.0 (876) | 8.6 (1506) | 2.5 (438) |
| Example 2 | 10.0 (1751) | 6.2 (1086) | 7.1 (1243) | 2.7 (473) |
| Comp. Example 3 | 8.6 (1506) | 3.5 (613) | 6.4 (1121) | 1.7 (298) |

Tuft Bind Strength = TBS
Delamination Strength = DS

As can be seen in Table 1, inventive Examples 1 and 2 clearly outperformed Comparative Example 3 in every one of the four categories tested.

Although the invention is illustrated and described herein with reference to specific embodiments, the invention is not intended to be limited to the details shown. Rather, various modifications may be made in the details within the scope and range of equivalents of the claims without departing from the invention.

The invention claimed is:

1. An aqueous carpet coating composition comprising a particulate filler, a polymeric thickener and an aqueous dispersion of a copolymer, said copolymer comprising from 80 to 95 wt % vinyl acetate units and from 5 to 20 wt % ethylene units, in each case based on the total amount of monomer units in the copolymer, said aqueous dispersion being prepared by emulsion polymerization of the monomers constituting the copolymer in the presence of a stabilization system comprising
   a) 1.5 to 3 wt %, based on the on the total amount of monomers, of a combination of polyvinyl alcohols comprising a1) one or more partially hydrolyzed polyvinyl alcohols with a degree of hydrolysis of 85 to 95 mol % and a Hoeppler viscosity of 10-33 mPa·s, and a2) one or more highly hydrolyzed polyvinyl alcohols with a degree of hydrolysis of 98 to 100 mol % and a Hoeppler viscosity of 10-33 mPa·s; and b) 1.5 to 3 wt %, based on the total weight of monomers, of an emulsifier component consisting of one or more nonionic emulsifiers and one or more anionic emulsifiers, wherein the one or more anionic emulsifiers constitute from 3 to 12 wt % of the emulsifier component;

wherein the copolymer has a glass transition temperature Tg in a range from 0° C. to 22° C. and the aqueous dispersion of the copolymer has a Brookfield LV viscosity of ≤1500 mPa·s, and wherein the amount of polymeric thickener is no more than 6 wt % relative to the amount of aqueous dispersion of the copolymer, and wherein the Brookfield RV viscosity of the aqueous carpet coating composition is in a range from 6000 to 7000 mPa·s.

2. The aqueous carpet coating composition of claim 1, wherein the copolymer comprises from 85 to 92 wt % vinyl acetate units and from 8 to 15 wt % ethylene units.

3. The aqueous carpet coating composition of claim 1, wherein the copolymer is free of crosslinking monomer units.

4. The aqueous carpet coating composition of claim 1, wherein the copolymer is not crosslinked with an external crosslinker.

5. The aqueous carpet coating composition of claim 1, wherein the combination of polyvinyl alcohols is present at 2-3 wt %.

6. The aqueous carpet coating composition of claim 1, wherein the composition is free of alkylphenol ethoxylates and esters thereof.

7. The aqueous carpet coating composition of claim 1, wherein the aqueous dispersion of the copolymer has a Brookfield LV viscosity of at most 800 mPa·s.

8. The aqueous carpet coating composition of claim 1, wherein the aqueous dispersion contains less than 5 ppm of formaldehyde.

9. A carpet comprising yarn tufts bonded to a primary backing via application and subsequent drying of the aqueous coating composition of claim 1.

10. A method of making a carpet, comprising inserting yarn tufts into a primary backing, applying the aqueous coating composition of claim 1, and drying the aqueous coating composition.

* * * * *